Patented Dec. 6, 1949

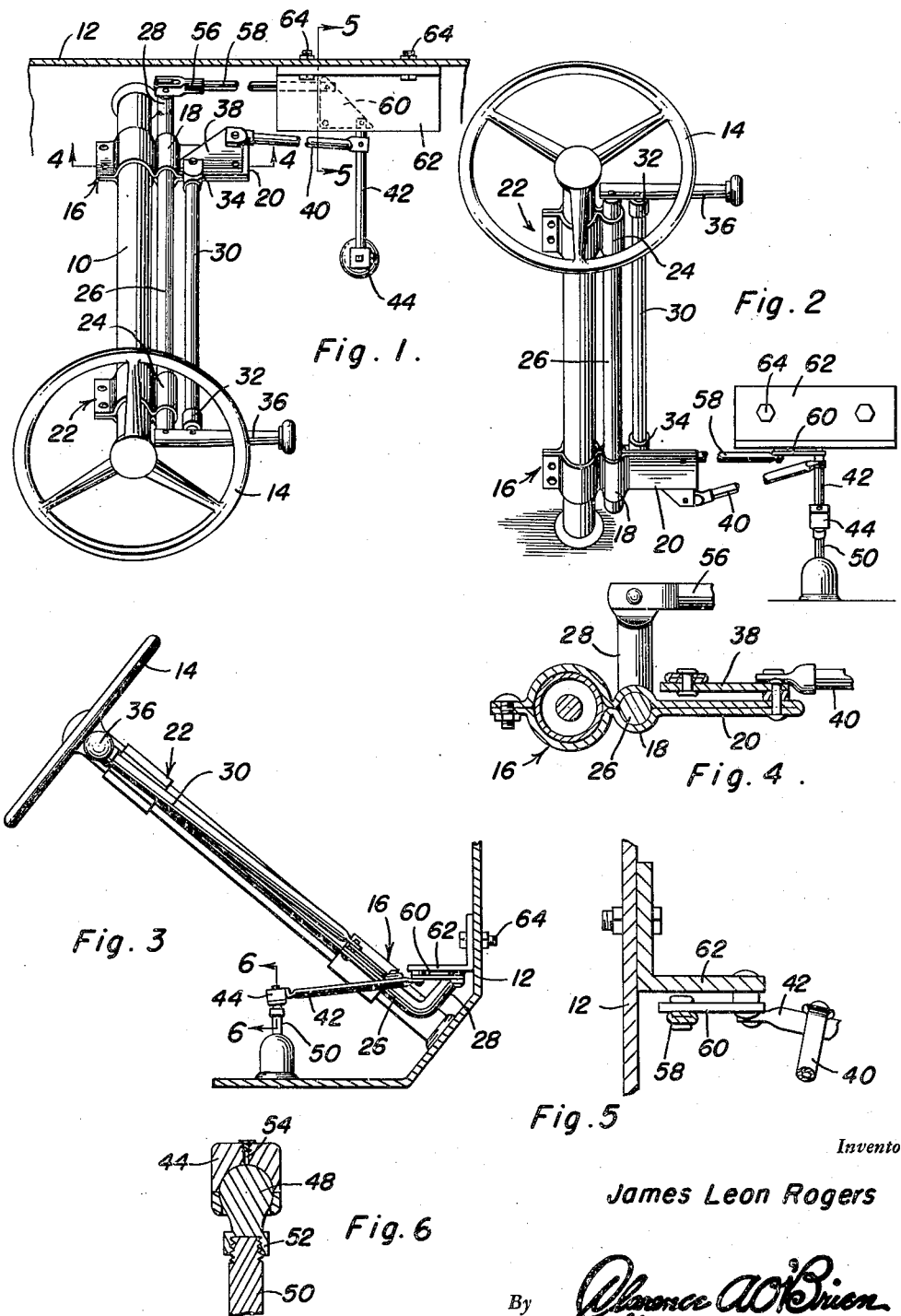

2,490,708

UNITED STATES PATENT OFFICE 2,490,708

GEAR SHIFT ATTACHMENT

James Leon Rogers, Fort Worth, Tex.

Application May 7, 1948, Serial No. 25,741

1 Claim. (Cl. 74—484)

This invention relates to novel and useful improvements in attachments for automotive vehicles, and for the purpose of converting from the manual floor type shift to the manual steering column type shift.

An object of this invention is to convert a vehicle of the type having a gear shift lever extending from the floor to a type capable of gear ratio changes from actuation of the mechanism attached to the steering column.

Another object of this invention is to transmit movement of a rod and a crank which is mounted on the steering column to movement of a shortened gear shift lever.

Another object of this invention is to provide a simple and economically manufactured device of the character to be described, which is designed to render the interior of a vehicle adjacent the operator thereof more spacious due to the absence of the usual gear shift lever extending from the floor.

Ancillary objects and features of novelty will become apparent to those skilled in the art, in following the description of the preferred form of the invention, illustrated in the accompanying drawings, wherein:

Figure 1 is a sectional view of a portion of the vehicle, showing the steering column, steering wheel and the preferred form of the invention in perspective;

Figure 2 is a front view of the device shown in Figure 1;

Figure 3 is a side view of the invention shown in Figure 1;

Figure 4 is a sectional view taken substantially on the line 4—4 of Figure 1 and in the direction of the arrows;

Figure 5 is a sectional view taken substantially on the line 5—5 of Figure 1 and in the direction of the arrows, and;

Figure 6 is a sectional detail of construction taken substantially on the line 6—6 of Figure 3 and in the direction of the arrows.

This invention has been devised in order to convert the usual, now out dated, type of gear shift mechanism to that of a more convenient type. As is well known many conventional vehicles are supplied with gear shifting levers which extend from the transmission of the vehicle through the floor boards thereof. This presents a problem of usurpation of valuable space interfering with the comfort of the passenger who desires to seat himself adjacent the operator or the vehicle. Therefore, it is proposed by the present invention to convert such a vehicle by utility of the present invention, to one wherein the space required for the lever shift is used in another position of the interior of the vehicle such as close to the steering column, which space is of substantially no value under ordinary conditions.

A conventional vehicle is utilized as the recipient of the present invention and this conventional vehicle is shown fragmentarily in the drawings. The steering column 10 is illustrated as is a portion of the floor boards and the dash 12. The usual steering wheel 14 is shown as projecting from the steering column 10, this being the usual arrangement.

A bracket generally indicated at 16 is attached to the lower portion of the steering column by any suitable means such as bolts extending through the bracket and clamping the engaging sections of the bracket with the exterior surface of the said steering column 10. This bracket has a sleeve type bearing 18 formed integral therewith and a shelf 20 extending from the bearing.

The second bracket generally indicated at 22 is attached to the upper portion of the steering column in a like manner and spaced from the first mentioned bracket 16. A sleeve type bearing 24 is formed integral with the bracket 22 for the purpose of rotatably mounting a crank shaft 26 therein. This crank shaft has a crank arm 28 at one end thereof and is additionally rotatably supported in the said sleeve type bearing 18.

A rod 30 having threadedly adjustable or swivelled couplings 32 and 34 respectively at each end thereof is associated with the described mechanism and forms a portion of the present invention. This rod 30 connects at one end to a handle 36 through the medium of a conventional pivot pin (unnumbered) and connects with a bell crank 38 at the other end through the medium of a pivotal connection. As is seen in Figure 1 the said handle 36 not only connects the rod 30 but also is pivotally associated with the said crankshaft 26.

The said bell crank 38 is pivotally mounted on the said shelf 20 and is used for the purpose of transmitting substantially axial movement of the rod 30 in one direction to substantially axial movement of a link 40 in a transverse direction. This link 40 is pivotally associated with the bell crank 38 and is secured to an arm 42 at the opposite end thereof.

The said arm 42 is supplied with a cap 44 at one end thereof, which cap is adapted to receive a ball 48 therein (see Figure 6). Said ball 48 is an attachment connection for universally associating the link 40 with the cut off shift lever 50. The connection between the ball and the shift lever 50 may be made in a simple fashion, such as by supplying an internally threaded boss 52 integral with the ball and threading the cut off lever 50. Then, a threaded connection may be effected. Further, bores 54 may be supplied in the cap 40 in order to receive lubricant for this ball and socket connection.

The crank arm 28 of the crankshaft 26 has a bifurcated coupling 56 pivoted thereto and this bifurcated coupling is threadedly connected with a member thereby forming a link or pitman 58. This pitman 58 is pivotally associated with a bell crank lever 60.

A support 62 is attached to the dash 12 through the medium of conventional bolts 64 or the like and serves the purpose of a mount for the bell crank lever 60. It may now be seen that by rotated movement of the crank arm 28, this rotated movement is translated to the bell crank or pivoted plate 60. Further, the free end of the bell crank or pivoted plate 60 has the arm 42 (previously described) pivotally secured thereto. Now it is readily appreciated that upon movement of the pitman 58 and consequently pivotal movement of the pivoted plate 60, the shift lever stub 50 is required to move in a predetermined direction and path.

In operation the preferred form of the invention reacts as follows:

The handle 36 is first moved toward or away from the steering wheel 14 thereby pulling or pushing the rod 30. This pushing or pulling movement is transmitted to the bell crank 38 which in turn transmits it to the link 40. Since the link 40 is secured to the arm 42, the said arm moves the shift lever stub 50 in a side to side motion. The actual transmission of this movement in this manner is effected due to the temporary anchoring of the pivoted plate 60. It is pivoted at one point and the pitman 58 prevents it from pivotal movement about this pivot. Therefore, it acts as an anchor while moving the handle 36 toward and away from the steering wheel 14.

Then in order to move the stub gear shift lever 50 in a forward and backward direction, the handle 36 is pushed forward or backward in a direction substantially parallel to the steering wheel 14. This will apply a torque to the crankshaft 26, turning the same and moving the pitman 58. As the pitman 58 is moved the pivoted plate 60 is moved in the only direction which it is capable of moving (pivotal) thereby carrying with it the arm 42. This of course will move the stub shift lever 50 into any gear ratio desired due to the forward or backward movement of the stub shift lever 50.

It will be noted that certain of the movements of the arm 42 will be slightly arcuate when the ideal is to have that movement absolutely linear. However, in conventional vehicles enough lost motion or play is supplied in the usual transmission shift mechanism (within the actual transmission) to compensate for such arcuate movement. Further, the throw of the shift lever 50 is of such a small degree that the arcuate movement rather than completely lineal movement is compensated more. Notwithstanding the ball and socket connection at the gear shift stub lever 50 takes care of the majority of the objectionable arcuate movement, utilizing the lineal travel thereof to advantage.

While it has been described and illustrated but a preferred form of the invention, it is apparent that certain variations may be made without departing from the spirit thereof. Accordingly, limitation is sought only in accordance with the scope of the following claim.

Having described the invention, what is claimed as new is:

In combination with the inclined steering column and the universally movable gear selecting and shifting lever of a motor vehicle, said lever being disposed to one side of said steering column, a shaft rotatably mounted on and disposed beside said steering column and having a forwardly directed crank arm at its lower end, an operating handle pivoted at one end to the upper end of said shaft so as to swing up and down relative thereto, a substantially horizontal bell crank lever pivotally mounted substantially directly in front of said gear selecting and shifting lever, a link connecting said crank arm with one end of said bell crank lever, an actuating arm universally connected at its rear end to said gear selecting and shifting lever and pivotally connected at its forward end to the other end of said bell crank lever, a second bell crank lever pivotally mounted beside the lower portion of said shaft, a second link pivoted at one end to one end of said second bell crank lever and at its other end to said actuating arm adjacent the first named bell crank lever, and a rod disposed beside said shaft, said rod being swivelled and pivoted at its upper end to said handle and pivoted at its lower end to the other end of said second bell crank lever.

JAMES LEON ROGERS.

REFERENCES CITED

The following references are of record in the file of this patent:

UNITED STATES PATENTS

| Number | Name | Date |
|---|---|---|
| 2,154,513 | Kuntz | Apr. 10, 1939 |
| 2,174,950 | Solasse | Oct. 3, 1939 |
| 2,257,632 | Wahlberg | Sept. 30, 1941 |
| 2,312,975 | Peterson | Mar. 2, 1943 |